(12) United States Patent
Brothers et al.

(10) Patent No.: US 8,892,614 B2
(45) Date of Patent: Nov. 18, 2014

(54) CALCULATOR WITH DYNAMIC COMPUTATION ENVIRONMENT

(75) Inventors: Malgorzata Anna Brothers, Plano, TX (US); Gregory Grant Michalak, McKinney, TX (US); Michael Lee Taylor, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 665 days.

(21) Appl. No.: 13/118,191

(22) Filed: May 27, 2011

(65) Prior Publication Data

US 2011/0302228 A1 Dec. 8, 2011

Related U.S. Application Data

(60) Provisional application No. 61/352,054, filed on Jun. 7, 2010.

(51) Int. Cl.
*G06F 13/00* (2006.01)
*G06F 15/02* (2006.01)

(52) U.S. Cl.
CPC .................................... *G06F 15/02* (2013.01)
USPC .......................................................... 708/174

(58) Field of Classification Search
CPC ....... G06F 15/02; G06F 3/147; G06F 1/1616; G06F 1/165; G06F 1/1671
USPC .......................................................... 708/174
See application file for complete search history.

(56) References Cited

U.S. PATENT DOCUMENTS 8,266,493 B1 * 9/2012 Abbaszadeh et al. ......... 714/752

OTHER PUBLICATIONS

Malgorzata Anna Brothers, "Static Groups in Dynamic Computation Environment", U.S. Appl. No. 13/029,215, filed Feb. 17, 2011, pp. 1-35.

* cited by examiner

*Primary Examiner* — Tan V. Mai
(74) *Attorney, Agent, or Firm* — Mima Abyad; W. James Brady; Frederick J. Telecky, Jr.

(57) ABSTRACT

A dynamic computational environment may create, in response to user input, a plurality of mathematical expressions. In the dynamic computational environment, a change made to any one of the plurality of mathematical expressions will be propagated to all of the mathematical expressions, such that each of the plurality of mathematical expressions affected by the change is updated.

14 Claims, 6 Drawing Sheets

CALCULATOR WITH DYNAMIC COMPUTATION ENVIRONMENT

CROSS-REFERENCE TO RELATED APPLICATIONS

This application claims benefit of U.S. Provisional Patent Application Ser. No. 61/352,054, filed Jun. 7, 2010, entitled "Dynamically Linked Text Environment" which is incorporated herein by reference in its entirety.

FIELD OF THE INVENTION

This invention generally relates to calculators, and in particular to sophisticated calculators that include two or more applications.

BACKGROUND OF THE INVENTION

Handheld calculators are well known in the art and have been in use for many years. Although many handheld calculators are limited to simple algebraic computations such as addition, subtraction, multiplication, and division, there are several commercially available sophisticated handheld calculators that are able to perform higher level mathematical computations. For example, some handheld calculators allow a user to input a plurality of quadratic equations into the handheld calculator. The handheld calculator may then graph each of the equations on a coordinate plane and determine the intersection of the lines or curves created by the equations. The handheld calculator may also solve the quadratic equations algebraically. The same handheld calculator can also allow a user to enter a higher order and/or multi-variable equation into the handheld calculator and provide values for some of the variables. The handheld calculator can then solve for the remaining variables. Handheld calculators that perform these functions are manufactured by numerous companies including Texas Instruments.

SUMMARY

Embodiments of the invention provide a dynamic computation environment in a computing system, such as a handheld calculator. A dynamic computational environment may create, in response to user input, a plurality of mathematical expressions. In the dynamic computational environment, a change made to any one of the plurality of mathematical expressions will be propagated to all of the mathematical expressions, such that each of the plurality of mathematical expressions affected by the change is updated

BRIEF DESCRIPTION OF THE DRAWINGS

Particular embodiments in accordance with the invention will now be described, by way of example, and with reference to the accompanying drawings.

DETAILED DESCRIPTION OF EMBODIMENTS OF THE INVENTION

Figure 1:
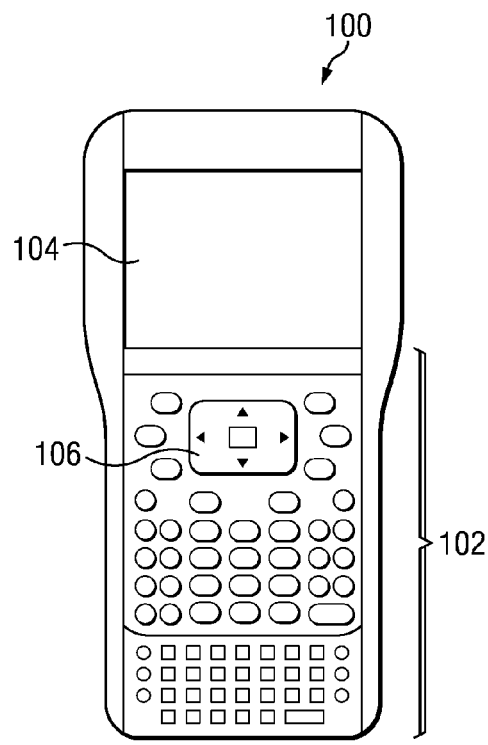
FIG. 1 shows an example of a calculator in accordance with one or more embodiments of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skills in the art that the invention may be practiced without these specific details. In other instances, well-known features have not been described in detail to avoid unnecessarily complicating the description.

Embodiments of the present invention are discussed below with respect to an embodiment on a handheld calculator. It should be noted, however, that embodiments of the present invention may be useful for other types of electronic devices, e.g., laptop computers, desktop computers, handheld computing devices. Examples of other types of handheld computing devices in which embodiments of the present invention may be useful include scientific calculators, advanced calculators able to upload and run software applications, handheld-sized limited-purpose computer devices, handheld-sized educational computer devices, handheld-sized portable computer devices, portable computer devices, personal digital assistants (PDAs), palmtop computers, cellular or mobile telephones, and any combination thereof.

In one embodiment of the invention, a plurality of mathematical expressions is created in a dynamic computational environment in response to user input. In a dynamic computational environment, a change made to any one of the plurality of mathematical expressions will be propagated to all of the mathematical expressions, such that each of the plurality of mathematical expressions affected by the change is updated. Thus, the dynamic computing environment allows a variable to be changed in a graphing environment and then propagated back to an algebraic environment that defines the expressions being graphed, for example.

Handheld calculators have progressed to be very sophisticated processing systems. A handheld calculator, such as the TI-Nspire™ from Texas Instruments, is capable of operating on one or more documents. In one version of such a calculator, each document may be divided into at least one, and up to thirty, problems. Each problem contains at least one, and up to fifty, pages. Each page can be divided into as many as four work areas. Each work area can contain any of the TI-Nspire™ applications: Calculator, Graph, Geometry, Lists & Spreadsheet, Data & Statistics and Notes.

A teacher may use an interactive instruction system, e.g., a handheld calculator connected to a computer system and a display device such as a digital projector and screen or interactive whiteboard, in a classroom to replicate the display of the handheld calculator in real time in a larger format on the display device for viewing by students, i.e., for presenting digital instruction to the students. More specifically, the teacher can perform operations using the handheld calculator and allow the students to view the results of the operations in real-time in the larger format provided by the display device. A teacher may also record in video from a sequence of operations performed on the handheld calculator, e.g., a lesson, in a file and play the recorded video to present it on the display device. Additional description of the operation of the TI-nspire calculator is provided in the "TI-nspire Teacher Software Guidebook" for software version 2.1, July 2010, which is incorporated by reference herein.

In one embodiment of the invention, an application may be selected from a Home Menu by clicking one of the following application icons: a static application called Calculator and dynamic applications such as Graph; Geometry; Lists & Spreadsheet; Data & Statistics; Notes—this is a text editor with math boxes that provides a dynamic computing environment. A dynamic computing environment may also be inserted into other dynamic applications, for example: Graphs or Geometry. In this embodiment, up to four applications may be open on each page. When a user creates a new document it contains space to add one application. If the user wishes to add more than one application to a page, the user can change the layout to accommodate as many as four applications.

Variable linking can help the user build and explore mathematical models. Values and functions created or defined in one application can interact with other applications within the same problem to share data. When using linked items, values can be linked between applications on one page or between different pages of the same problem. All applications are linked to the same data. If the linked value is changed in the original application, the change is reflected in all linked usages. Each application allows the user to define a value or function as a variable. Defining a variable is the first step in linking values in this dynamic computing environment.

A math box is simply a term that is used to describe an area in the display screen that holds a math expression that has in input expression, an output expression and a separator symbol. The input and output expressions may both include numbers and/or symbols. The symbol separator may be any of the typical math operations, such as: =, =>, <=, or even "NONE". For example: a+b=14. If the separator symbol is "NONE", then three spaces, for example, are displayed between the input expression and the output expression; for example: a+b    14.

A typical math problem may include a few or a large number of math boxes. The symbols may be stored in a symbol table and subscribed to by all of the math boxes in the problem. Each time the symbol is updated by any one of the math boxes in the problem, all occurrences of the symbol in the problem will be updated, as will be described in more detail below.

FIG. 1 shows an example of a handheld calculator 100 in accordance with one or more embodiments of the invention. For illustrative purposes, the handheld calculator illustrated in FIG. 1 is similar to graphing calculators available from Texas Instruments Inc. Handheld calculators with more or fewer components may be used in embodiments of the invention. As shown in FIG. 1, the handheld calculator 100 includes a graphical display 104, and a keypad 102 that includes a touchpad 106. The graphical display 104 may be used to display, among other things, information input to applications executing on the handheld calculator 100 and various outputs of the applications. The graphical display 104 may be, for example, an LCD display. The keypad 102 allows a user, e.g., a student or instructor, to enter data and functions and to start and interact with applications executing on the handheld calculator 100. The keypad 102 also includes an alphabetic keyboard for entering text. The touchpad 106 allows a user to interact with the display 104 by translating the motion and position of the user's fingers on the touchpad 106 to provide functionality similar to using an external pointing device, e.g., a mouse. A user may use the touchpad 106 to perform operations similar to using a pointing device on a computer system, e.g., scrolling the display 104 content, pointer positioning, selecting, highlighting, etc.

Figure 2:
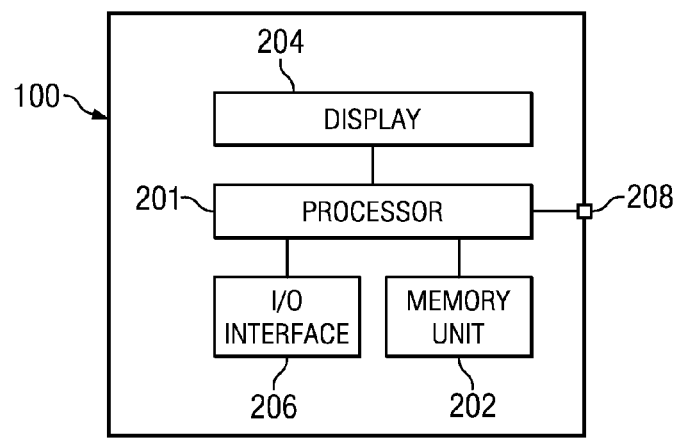
FIG. 2 is a block diagram of a calculator in accordance with one or more embodiments of the invention.

FIG. 2 is a block diagram of the handheld calculator 100 in accordance with one or more embodiments of the invention. The handheld calculator 100 includes a processor 201 coupled to a memory unit 202, which may include one or both of read-only memory (ROM) and random-access memory (RAM). In some embodiments of the invention, the ROM stores software programs and the RAM stores intermediate data and operating results. An input/output port 208 provides connectivity to external devices, e.g., a hub that is coupled to other handheld calculators and/or a classroom computer. The input/output port 208 may be a bi-directional connection such as a mini-A USB port. Also included in the handheld calculator 100 are a display 204 and an I/O interface 206. The I/O interface 206 provides an interface to couple input devices such as the touchpad 106 and the keypad 102 to the processor 201. In some embodiments of the invention, the handheld calculator 100 may also include an integrated wireless interface (not shown) or a port for connecting an external wireless interface (not shown).

Figure 3:
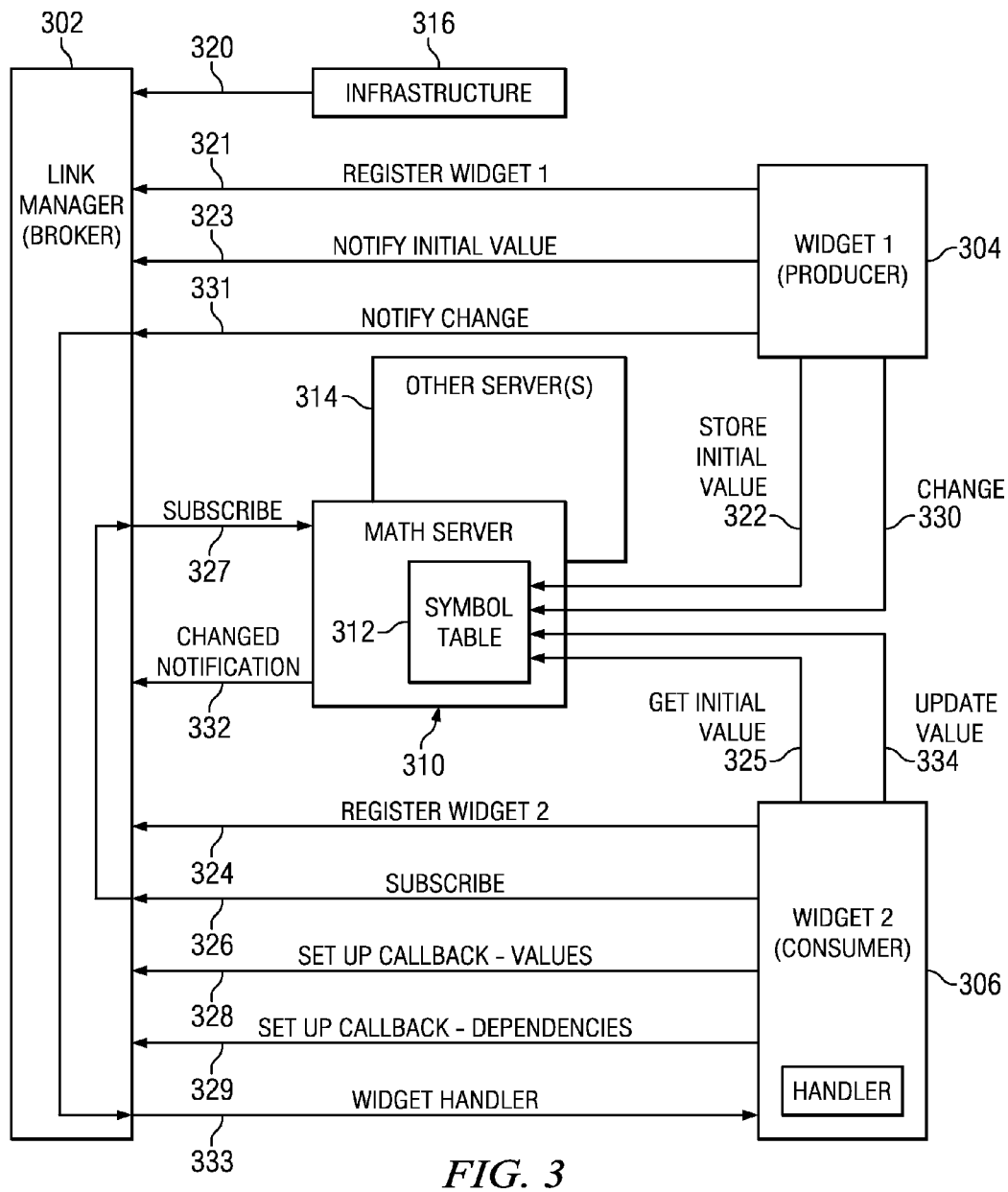
FIG. 3 is a flow diagram illustrating operation of a link manager for use in the calculator of FIG. 1.

FIG. 3 is a flow diagram illustrating operation of a link manager 302 that provides a dynamic computational environment for the calculator of FIG. 1. Embodiments of the invention use data linking in a publish/subscribe model that provides the ability to have notifications when subscribed data item is changed by a publisher. The publication/subscribe (Pub/Sub) model is a data dissemination model that contains a data producer 304, a data consumer 306, and a broker 302 that mediates between the two. Link manager 302 is an instantiation of code that provides an application programming interface (API) for the pub/sub model, and is the pub/sub broker.

In the example of FIG. 3, widget 304 is the data producer that is generating values. Widget 306 is the data consumer that is receiving the values generated by data producer 304. However, widget 304 may also be a data consumer and widget 306 may also be a data producer. Widgets 304 and 306 are representative of any of several applications that may be executed on the calculator of FIG. 1, such as a calculator, a graphing engine, a geometry engine, a spreadsheet, a list tool, a data/statistic analyzer, a text editor, etc.

Infrastructure code 316 is code that provides underlying services needed by the system. The infrastructure code controls data flow produced by the various applications (widgets) and collects a data set into one or more lists. The infrastructure responds to publish functions executed by a widget. For example, a widget may call for a variable store (VarStore) or an evaluation of an expression (EvalExpression) which results in produced data values being published to symbol table 312 in math server function 310. Other servers 314, such as a text editor, spreadsheet, etc., may also interact with infrastructure 316.

When a producer widget changes a data value, infrastructure code 316 is used to notify all subscribed widgets so they can handle the data change. When a consumer is notified that a subscribed symbol has changed, it has the option to not accept the change. Not accepting a change is called a Veto.

Values that can be linked by reference are first stored in the symbol table. All widgets displaying a value in the symbol table normally display the same current value unless the widget is showing history and not the current value. A widget can be both a data producer and a data consumer.

Referring again to the example in FIG. 3, when a new problem is started by a user of calculator 100, the infrastructure may execute a call to CreateLinkManagerinstance, which creates an instance 302 of the link manager. There is a separate link manager for each problem set that is being manipulated by the calculator. A call 320 to LM_RegisterServer associates a symbol table 312 with link manager instance 302. The names and exact operation of the various function calls used in this embodiment should be considered only as examples. Other embodiments may use different types of calls to implement another embodiment of the invention.

Data producer 304 may execute the following calls: LM_RegisterWidget 321 to register with link manager 302 and let it know data producer widget 304 is participating in linking; VarStore or EvalExpression 314 to put a value into the symbol table that can be linked; and LM_RefNotify 323 to notify the link manager that a particular symbol is being used by data producer 304. If the data producer knows that the particular symbol did not previously exist, then this call is not needed.

Data consumer 306 may then execute the following calls: LM_RegisterWidget 324 to register with the link manager 302 and let it know data consumer widget 306 is participating in linking; VarRecall 325 to get an initial value of a symbol and to validate that it can display/use the symbol; LM_Value_Subscribe 326 to subscribe 327 to the symbol; LM_Value_SetupCallback 328 which sets up a callback link that will be called when subscribed symbols for consumer 306 change; LM_Value_SetupCallbackForDependencies 329 which sets up a callback link that will be called when a dependency of a subscribed symbol changes.

At this point, the link is set up. From now on, every time data producer 304 calls LM_Ref_Notify 331 to indicate to the link manager that a symbol has been changed, data consumer's 306 callback link will be called. For example, data producer 304 may call VarStore or EvalExpression 330 to change a symbol value in symbol table 312. Data producer 304 then calls LM_Ref_Notify 331 to start notification of all subscribed widgets. Data consumer 306 is called 333 using the previously established callback link. In response to the callback notification, data consumer 306 calls VarRecall 334 to get the updated symbol value from symbol table 312. Note that while consumer widget 306 is illustrated, there may be more than one consumer and/or producer that is subscribed to a given symbol value.

Infrastructure code 316 is responsible for the following: instantiate a link manager for each problem; associate a symbol table with the link manager; change active link manager when problem space changes; and perform serialization of the current link manager when a document saved. Data producers are responsible for the following: generate values to be consumed by others; notify others when it is time to consume the values; handle returning to a previous state if it's notify is vetoed. Data consumers are responsible for the following: consuming values generated by a producer; ensuring that values displayed are the same as values in the symbol table; validating values generated by producer; and vetoing values that it cannot accept.

All widgets that participate in linking should register with the link manager 302 first. A participating widget should always notify the link manager after changing the symbol table via Varstore or EvalExpression function calls. A widget should subscribe to any symbol table symbol for which the widget displays the value in its user interface (UI). The symbol table is global to all widgets and all views should show the same value. A widget may change multiple symbols and then call Notify once. If notification comes back VETOED, the publisher revises its UI to reflect the current value of the symbol, i.e., the symbol will be returned to its original value.

For example: two widgets are showing variable X. Both widgets are subscribed to changes to X. A data collection widget from a probe is generating TIMELIST and TEMPLIST but not displaying the values of the lists. This widget may not have to subscribe to the symbols.

A data consumer widget should get a symbol's initial value and update its user interface (UI) preferably before subscribing. If the initial value is not valid for that consumer widget, the user should be notified and the widget should not subscribe to the symbol. When a consumer widget receives notification (i.e., its notification callback is called), it should perform the following checks for valid values: Range/Domain—value out of range or domain for consumer; Type—value type not valid for consumer, for example, a user changes List X to variable X; Existence—a user deletes a symbol, but the consumer widget needs it to exist. If the symbol is valid then it updates itself. If the symbol is not valid for this widget, the widget can VETO the notification by returning a VETO function value for the callback. If the consumer modifies the symbol table during its callback, it calls the Notify function to alert the link manger.

FIGS. 4A-4G show display 104 of the user interface of calculator 100 displaying several steps of an example problem to illustrate aspects of the dynamic computational environment of calculator 100. In this example, two application widgets are active in two windows on a page. Window 402 is displaying an interactive notes text editor widget, referred to as Notes, that also supports math expressions. Window 403 is displaying a Calculator widget. Notes provides a dynamic computational environment and can be a standalone application or inserted in other dynamic environments like Graphs or Geometry. Within a document in Notes, math expressions are created in math boxes in response to user input. When any symbol value is changed in any of the math boxes, the change is propagated to all of the math boxes. The Calculator widget alone provides a typical static environment. As math expressions are entered in Calculator, they are evaluated sequentially in typical calculator manner. There are no provisions to change a symbol value in an earlier calculation step. However, when the Notes widget is active, the symbols entered by a user in the Calculator window 403 may be linked with symbols having the same symbol name in Notes window 402 to extend aspects of the dynamic computational environment to the Calculator widget.

Figure 4A:
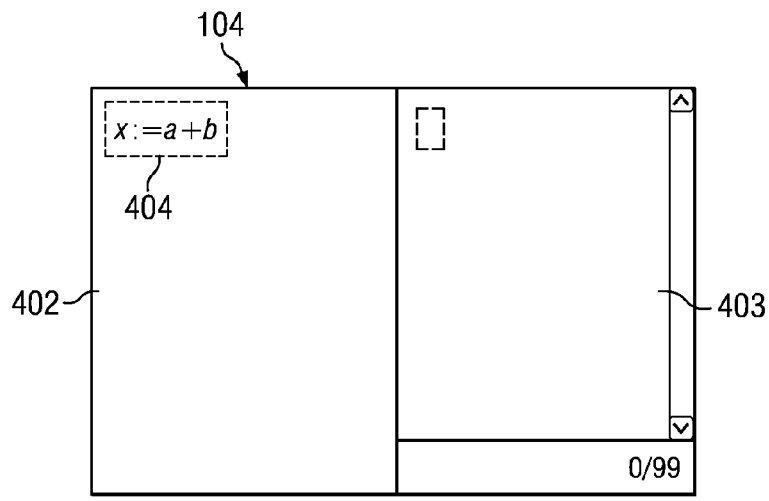
FIGS. 4A-4G illustrate an example problem on the user interface of the calculator of FIG. 1.
Figure 4B:
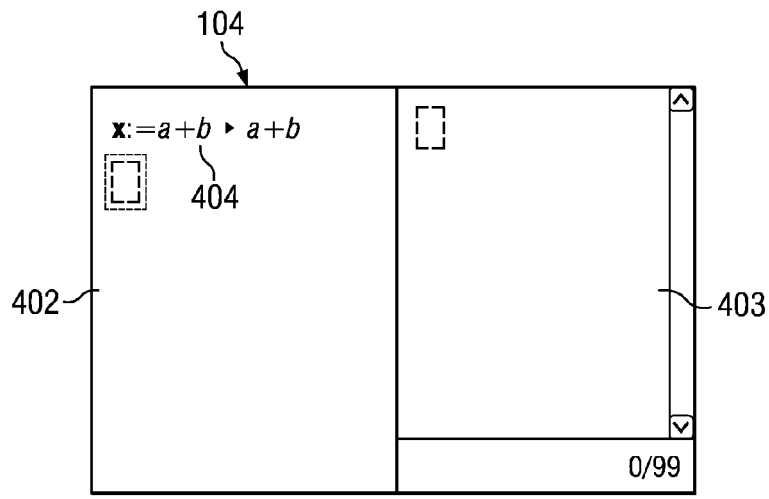

In FIG. 4A, a math box 404 with a mathematical expression has been created in response to user input via keyboard 102 of the user interface in the Notes widget. In this example, a user typed in the expression x:=a+b in window 402. The math box has not been evaluated. In FIG. 4B, the user has performed math box evaluation action, for example, by hitting the ENTER key. Since 'a' and 'b' are not defined, the results of the evaluation are displayed as "a+b" in window 402. However, the Notes widget is registered and symbols "x", "a" and "b" are all subscribed to in a symbol table, as discussed above with respect to FIG. 3.

Each math box in Notes is both a "data producer" and "data consumer". Calculator is just a "data producer". At this point the math box has registered with the link manager (LM_RegisterWidget 321) and set up its callback functions (LM_Ref_SetupCallback 328). These functions will be called by the link manager 302 when a variable of interest changes. Calculator has also registered with the link manager (LM_RegisterWidget 321).

When the user evaluates the math box, the math box will be parsed, looking for variables to which it should subscribe. In this example, the math box will subscribe (LM_Ref_Subscribe 326) to variables "x", "a" and "b". Next, the math box will call a math server 310 API to evaluate the contents of the math box. The math server API will store "x" (VarStore 322) into the symbol table. The math box will then notify the link manager (LM_Ref_Notify 323) that it should send notifications (WidgetsHandler 333) to any "consumers" interested in changes. NOTE: In this case the link manager will not send out any notifications even though the math box is interested in changes to "x". The link manager knows that the math box was the "producer" of this change. The math box will then display the results returned from the call to the math server 310, in this case "a+b."

Figure 4C:
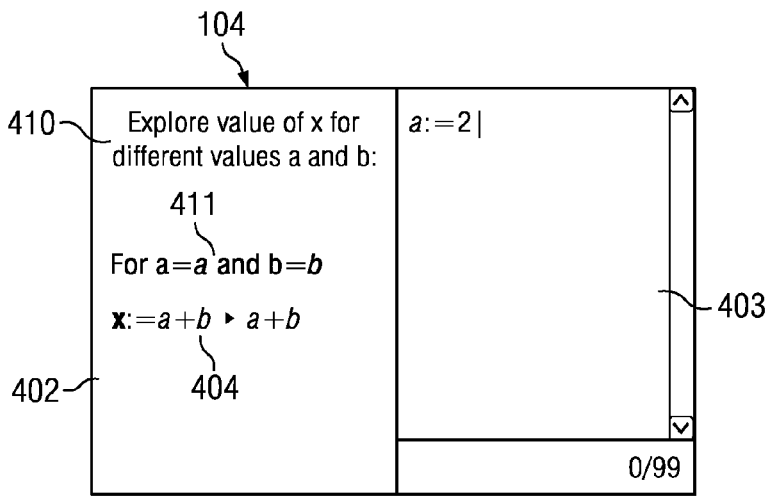
Figure 4D:
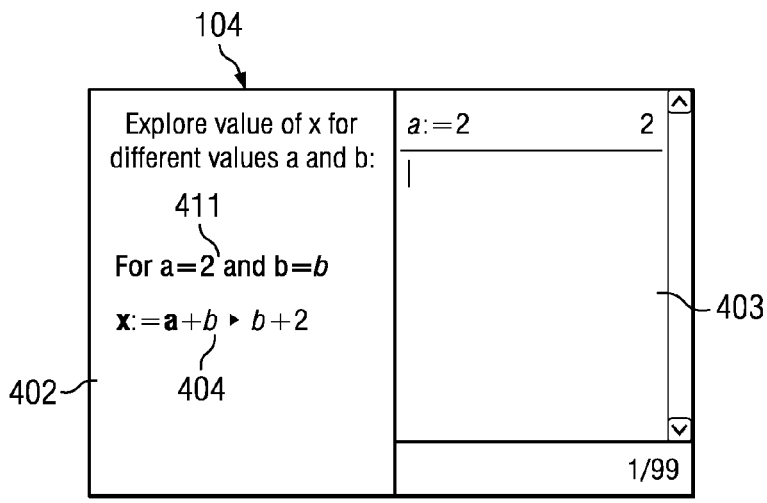

In FIG. 4C, a value of 2 is assigned to the variable "a" in Calculator window 403. The Calculator widget publishes this value for symbol "a" as discussed above with respect to FIG. 3. When the user hits ENTER in Calculator, the math box in Notes will get re-evaluated in a dynamic manner since the value of "a" has changed, as illustrated in FIG. 4D.

When the user hits ENTER in the Calculator, Calculator will call a math server 310 API to evaluate what the user has typed in. In this case the math server API will store "a" (VarStore 322) into the symbol table. Calculator will then notify the link manager (LM_Ref_Notify 323) that it should send notifications (WidgetsHandler 333) to any "Consumers" interested in changes. In this case, the link manager 302 will call the math box notification handler (WidgetsHandler 333) indicating that "a" has changed. The math box will then re-evaluate itself and update its output. The re-evaluation of the math box goes through the same sequence as described above.

FIG. 4C also illustrates another feature of Notes. Text boxes, such as text box 410 and text box 411 may also be created in response to user input via keyboard 102 of the user interface in the Notes widget. Variables may be included in text boxes, such as text box 411, that are updated each time the variable is changed in any application. In this example, a change to variable "a" made in the calculator widget is updated in text box 411 of the Notes widget, as illustrated in FIG. 4D.

Figure 4E:
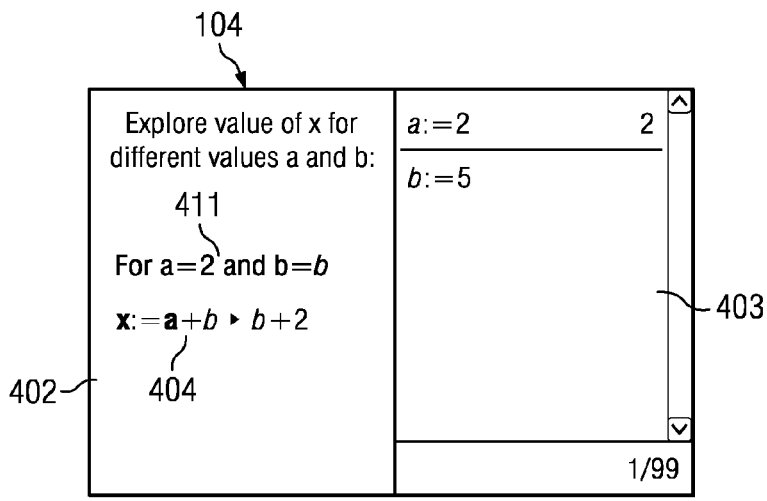
Figure 4F:
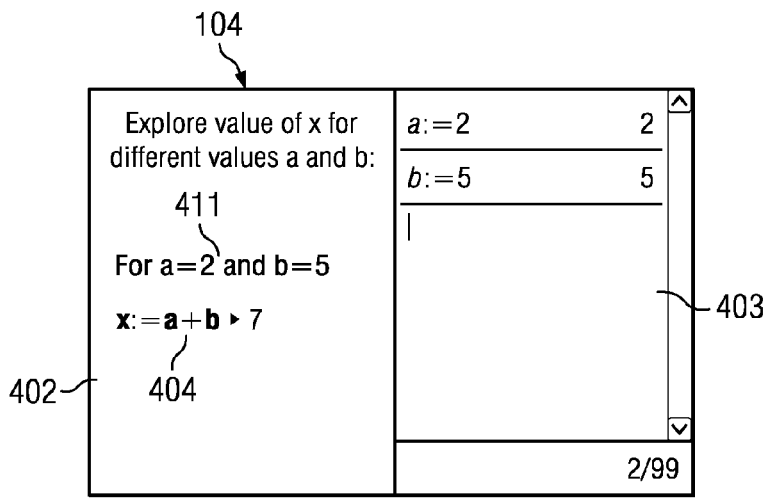

In FIG. 4E, a value of 5 is assigned to the variable "b" in Calculator window 403. The Calculator widget publishes this value for symbol "b" as discussed above with respect to FIG. 3. When the user hits ENTER in Calculator, the math box 404 and text box 411 in Notes will get re-evaluated in a dynamic manner since the value of "b" has changed, as illustrated in FIG. 4F.

Figure 4G:
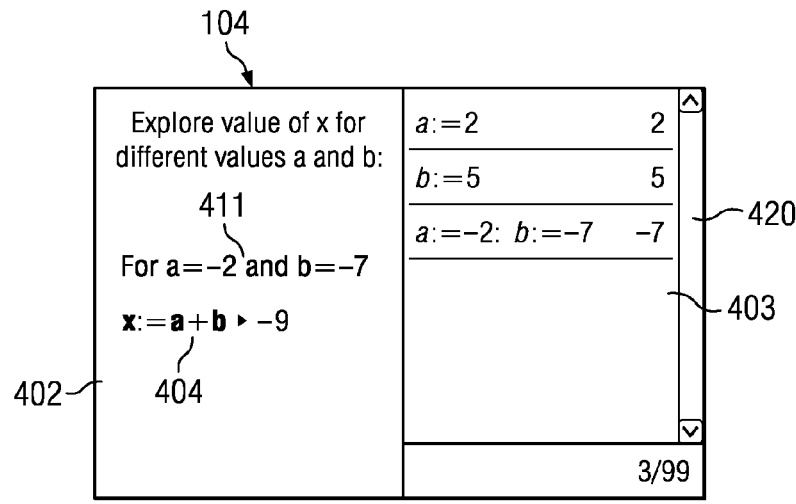

FIG. 4G illustrates another set of changes that are made to variables "a" and "b" in calculator widget 403 that are automatically propagated to other mathematical expressions and text boxes in different applications, such as math box 404 and text box 411 in Notes widget 402 by use of the dynamic computational environment.

Figure 5:
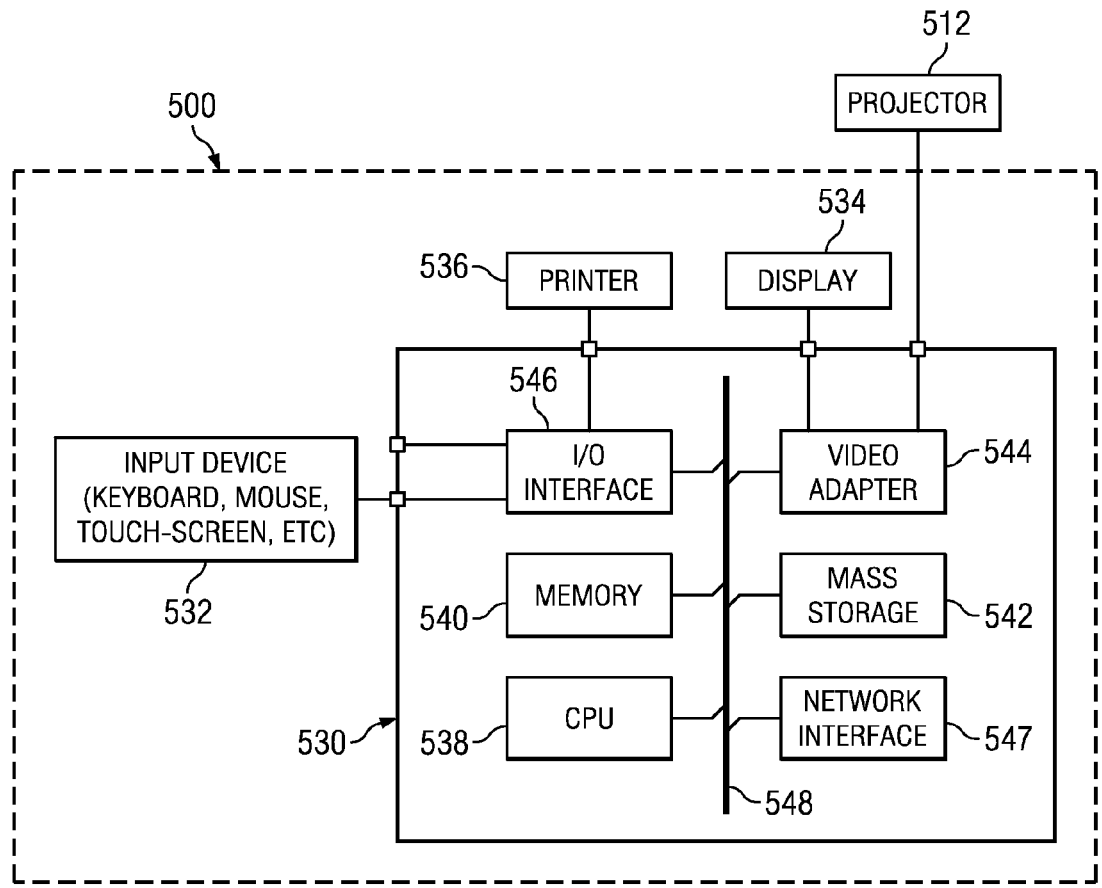
FIG. 5 is a block diagram illustrating an embodiment of the invention in a computer.

FIG. 5 is a block diagram illustrating an embodiment of the invention in a computer 500. In this embodiment, software executed on computer 500 includes various application widgets as described above. The computer also includes software to implement the infrastructure and servers as described above to provide a dynamic computing environment. Computer 500 may be used alone for creating and exploring various computational problems, or it may used in conjunction with a set of handheld calculators in a class room environment, for example. In this case, a teacher may be using the computer to display problems and scenarios that students then attempt to duplicate on their own handheld calculator.

The computer system 500 includes a processing unit 530 equipped with one or more input devices 532 (e.g., a mouse, a keyboard, or the like), and one or more output devices, such as a display 534, a printer 536, or the like. In some embodiments of the invention, the display 534 may be touch screen, thus allowing the display 534 to also function as an input device. The processing unit 530 may be, for example, a desktop computer, a workstation, a laptop computer, a dedicated unit customized for a particular application, or the like. The display may be any suitable visual display unit such as, for example, a computer monitor, an LED, LCD, or plasma display, a television, a high definition television, an interactive white board, or a combination thereof.

The processing unit 530 includes a central processing unit (CPU) 538, memory 540, a mass storage device 542, a video adapter 544, and an I/O interface 546 connected to a bus 548. The bus 548 may be one or more of any type of several bus architectures including a memory bus or memory controller, a peripheral bus, video bus, or the like. The CPU 538 may be any type of electronic data processor. For example, the CPU 538 may be a processor from Intel Corp., a processor from Advanced Micro Devices, Inc., a Reduced Instruction Set Computer (RISC), an Application-Specific Integrated Circuit (ASIC), or the like. The memory 540 may be any type of system memory such as static random access memory (SRAM), dynamic random access memory (DRAM), synchronous DRAM (SDRAM), read-only memory (ROM), a combination thereof, or the like. Further, the memory 540 may include ROM for use at boot-up, and DRAM for data storage for use while executing programs.

The mass storage device 542 (e.g., a computer readable medium) may comprise any type of storage device configured to store data, programs, and other information and to make the data, programs, and other information accessible via the bus 548. In one or more embodiments of the invention, the mass storage device 542 stores the dynamic computation environment software to be executed by the CPU 538. The mass storage device 542 may be, for example, one or more of a hard disk drive, a magnetic disk drive, an optical disk drive, or the like. The dynamic computation environment software may be initially stored in a computer-readable medium such as a compact disc (CD), a diskette, a tape, a file, memory, or any other computer readable storage device and loaded and executed by the CPU 538. In some cases, the dynamic computation environment software may also be sold in a computer program product, which includes the computer-readable medium and packaging materials for the computer-readable medium. In some cases, the dynamic computation environment software may be distributed to the computer system 500 via removable computer readable media (e.g., floppy disk, optical disk, flash memory, USB key), via a transmission path from computer readable media on another computer system (e.g., a server), etc.

The video adapter 544 and the I/O interface 546 provide interfaces to couple external input and output devices to the processing unit 530. As illustrated in FIG. 5, examples of input and output devices include the display 534 and projector 512 coupled to the video adapter 544 and the mouse/keyboard 532 and the printer 536 coupled to the I/O interface 546.

The processing unit 530 also includes a network interface 547. The network interface 547 allows the processing unit 530 to communicate with remote units via a network (not shown). In one or more embodiments of the invention, the network interface 547 allows the computer system 500 to communicate via a network to the handheld calculators. The network interface 547 may provide an interface for a wired link, such as an Ethernet cable or the like, or a wireless link.

The computer system 500 may also include other components not specifically shown. For example, the computer system 500 may include power supplies, cables, a motherboard, removable storage media, cases, and the like.

Presentation software on the computer system 500 may include functionality to receive a display stream from a handheld calculator and display screen images provided on the display device of the computer system 500 along with a user interface for controlling the presentation of the screen images. In one or more embodiments of the invention, the presentation software includes functionality to allow a user to select one of the handheld calculators to provide a display stream for presentation. Further, in some embodiments of the invention, two or more of the handheld calculators may be selected to provide display streams for simultaneous presentation. The display stream may be stored in the format received and/or in any other suitable format, e.g., audio visual interleave (avi) format. In some embodiments of the invention, the entire display stream is stored for the duration of the presentation session. In some embodiments of the invention, the amount of the display stream stored is less than the entire display stream. For example, a buffer may be used to store a portion of the display stream as it is received such that when the buffer becomes full, the oldest portion of the stored display stream is eliminated to make room for newer portions. The size of this buffer may be fixed or may be set by user input.

In some embodiments of the invention, the presentation software also includes functionality to display key presses and/or touchpad actions corresponding to the screen images according to key press indicators and/or touchpad indicators received in the display stream. The display of the key presses and/or touchpad actions may be a key press/touchpad action history and/or by highlighting keys and/or a touchpad on a calculator skin displayed in conjunction with the screen images.

Figure 6:
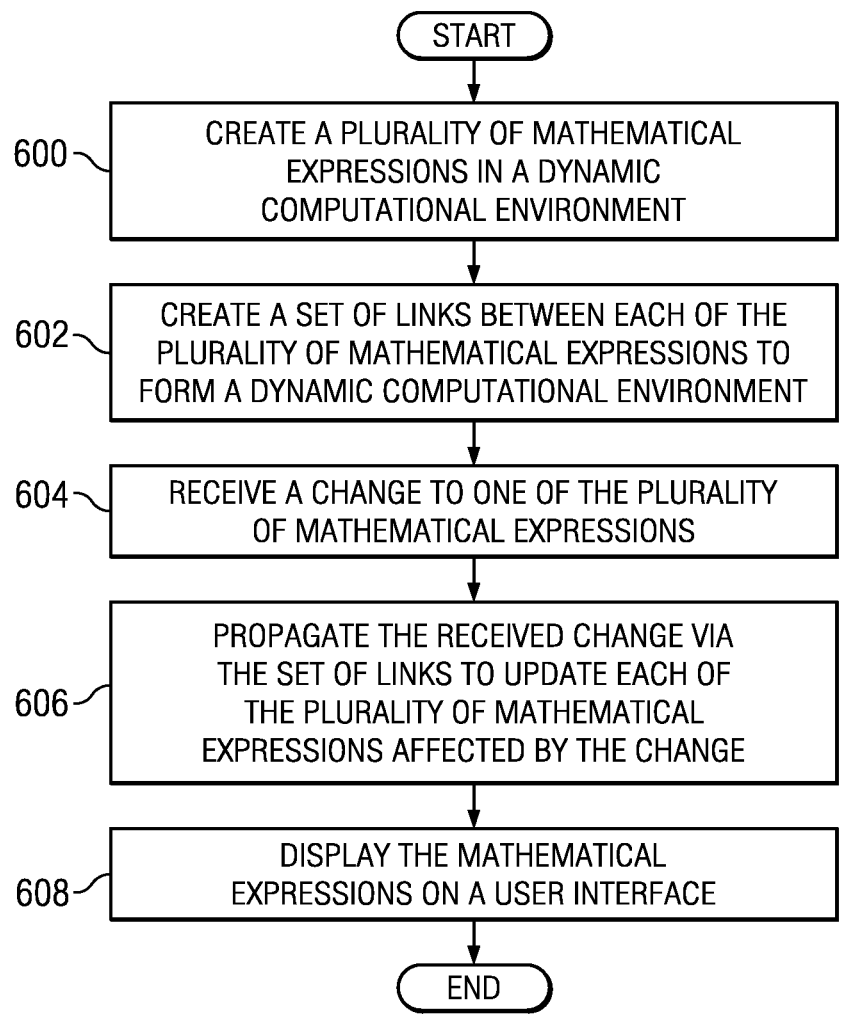
FIG. 6 is a flow diagram illustrating operation of a dynamic computational environment.

FIG. 6 is a flow diagram illustrating operation of a dynamic computational environment in a computing system, such as calculator 100 or computer 500. A dynamic computational environment may create 600, in response to user input, a plurality of mathematical expressions in several different applications that are provided by the computing system. The user input may be provided via a keyboard on a handheld device or on a computer system or other fixed or portable device that is configured to provide a dynamic computational environment. In other embodiments, user input may be provided via a touch sensitive screen or by other user input techniques now known or later developed. In the dynamic computational environment, a change made to any one of the plurality of mathematical expressions will be propagated to all of the mathematical expressions in the various applications, such that each of the plurality of mathematical expressions affected by the change is updated, regardless of which application it is in.

In order to propagate the changes, a set of links is created 602 between each of the plurality of mathematical expressions to form a dynamic computational environment within the calculator, as was explained in more detail with respect to FIG. 3.

In response to user input to the computing system, a change to one of the plurality of mathematical expressions is received 604. The user input may be done by the user using a pointing device, such as touchpad 106 illustrated in FIG. 1 or mouse 532 illustrated in FIG. 5, for example. As the user selects a mathematical expression in an mbox, control software executed on the device may display a visual cue, such as highlighting or shading, to indicate that a particular variable is being modified. Other embodiments may use other visual cues, such as highlighting a selected mbox, changing font and/or color of the selected mathematical expressions, etc.

The received change is propagated 606 via the set of links to update each of the plurality of mathematical expressions affected by the change. This dynamic computing environment may provide dynamic linking between an algebraic environment and a graphic environment on the system, for example. The graphic environment may include graphing capability, geometry presentation, data and statistic manipulation, etc. The dynamic computing environment may provide dynamic linking between a programming environment and the graphic environment, for example. Thus, the dynamic computing environment allows a variable to be changed in a graphing environment and then propagated back to an algebraic environment that defines the expressions being graphed, for example.

The mathematical expressions may be displayed 608 on a user interface, as described in more detail with regard to FIGS. 4A-4F.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, other embodiments may provide only a single application or may provide applications other than those described herein that may be coupled into a dynamic computation environment.

While math boxes holding equations were described herein, other embodiments of a mathematical expression may be a graph, a program, a spread sheet, etc.

A publish and subscribe technique was described herein for providing the dynamic computational environment. Other embodiments may use other techniques for propagation of symbol updates to other mathematical expressions, such as message passing, polling, etc.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the following description and the claims to refer to particular system components. As one skilled in the art will appreciate, components of computer and handheld calculator systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless connection. Thus, if a first device couples to a second device, that connection may be through a direct connection, through an indirect connection via other devices and connections, through an optical connection, and/or through a wireless connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

What is claimed is:

1. A method of a signal processor of a calculator, the method comprising:
   creating, via the signal processor, in response to user input to the calculator, a plurality of mathematical expressions;
   creating a set of links between each of the plurality of mathematical expressions to form a dynamic computational environment within the calculator;
   receiving, in response to user input to the calculator, a change to one of the plurality of mathematical expressions; and
   propagating the received change via the set of links to update each of the plurality of mathematical expressions affected by the change.

2. The method of claim 1, wherein the plurality of mathematical expressions are located in two or more applications within the calculator.

3. The method of claim 2, wherein a first one of the two or more applications is an algebraic environment and a second one of the two or more applications is a graphing environment.

4. The method of claim 2, wherein a first one of the two or more applications is a programming environment and a second one of the two or more applications is a graphing environment.

5. The method of claim 1, further comprising displaying the plurality of mathematical expression on a user interface.

6. The method of claim 1, wherein a mathematical expression is an equation, a graph, a program or a spread sheet.

7. A computing system, comprising:
   a user interface having a display and an input device; and
   a processor coupled to the user interface and to memory, wherein the processor is configured to execute program instructions stored in the memory to produce a dynamic computational environment, wherein, the program instructions are configured to:
      create, in response to user input to the computing system, a plurality of mathematical expressions;
      create a set of links between each of the plurality of mathematical expressions to form a dynamic computational environment within the calculator;
      receive, in response to user input to the computing system, a change to one of the plurality of mathematical expressions; and
      propagate the received change via the set of links to update each of the plurality of mathematical expressions affected by the change.

8. The computing system of claim 7, wherein the user interface is configured to display the plurality of mathematical expression.

9. The computing system of claim 7 being a handheld calculator.

10. A non-transitory computer readable medium comprising executable instruction to cause a calculator to perform a method comprising:
    creating, in response to user input to the calculator, a plurality of mathematical expressions;
    creating a set of links between each of the plurality of mathematical expressions to form a dynamic computational environment within the calculator;
    receiving, in response to user input to the calculator, a change to one of the plurality of mathematical expressions; and
    propagating the received change via the set of links to update each of the plurality of mathematical expressions affected by the change.

11. The method of claim 10, wherein a mathematical expression is an equation, a graph, a program or a spread sheet.

12. The method of claim 10, wherein the plurality of mathematical expressions are located in two or more applications within the calculator.

13. The method of claim 12, wherein a first one of the two or more applications is an algebraic environment and a second one of the two or more applications is a graphing environment.

14. The method of claim 12, wherein a first one of the two or more applications is a programming environment and a second one of the two or more applications is a graphing environment.

* * * * *